(12) United States Patent
Buerglin et al.

(10) Patent No.: US 8,122,709 B2
(45) Date of Patent: Feb. 28, 2012

(54) DEVICE FOR DELIVERING A REDUCING AGENT TO AN EXHAUST SYSTEM OF AN INTERNAL COMBUSTION ENGINE

(75) Inventors: Markus Buerglin, Ditzingen (DE); Dirk Heilig, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 670 days.

(21) Appl. No.: 12/298,046

(22) PCT Filed: Mar. 7, 2007

(86) PCT No.: PCT/EP2007/052108
§ 371 (c)(1),
(2), (4) Date: Oct. 22, 2008

(87) PCT Pub. No.: WO2007/122035
PCT Pub. Date: Jan. 11, 2007

(65) Prior Publication Data
US 2009/0064667 A1 Mar. 12, 2009

(30) Foreign Application Priority Data
Apr. 25, 2006 (DE) .................. 10 2006 019 051

(51) Int. Cl.
*F01N 3/00* (2006.01)
(52) U.S. Cl. ............... 60/286; 60/273; 60/287; 60/295; 60/301; 137/565.16; 251/129.15; 251/129.17
(58) Field of Classification Search ............ 60/274, 60/284–287, 295–301; 137/565.16, 599.11, 137/625.4; 251/129.15, 129.17
See application file for complete search history.

(56) References Cited

U.S. PATENT DOCUMENTS

| | | | | |
|---|---|---|---|---|
| 5,526,837 A * | 6/1996 | Eaker | ................. | 137/1 |
| 5,709,080 A * | 1/1998 | Arora et al. | .................... | 60/274 |
| 5,753,188 A * | 5/1998 | Shimoda et al. | ............. | 422/108 |
| 6,526,746 B1 * | 3/2003 | Wu | ................................. | 60/286 |
| 6,539,708 B1 * | 4/2003 | Hofmann et al. | ............... | 60/286 |
| 6,543,746 B2 * | 4/2003 | Bircann et al. | ............... | 251/214 |
| 6,550,250 B2 * | 4/2003 | Mikkelsen et al. | ............ | 60/685 |
| 6,792,966 B2 * | 9/2004 | Harvey | ........................ | 137/265 |
| 7,481,049 B2 * | 1/2009 | Huber et al. | ................... | 60/324 |
| 7,775,036 B2 * | 8/2010 | Barcin | ............................ | 60/286 |
| 7,866,144 B2 * | 1/2011 | Bakaj et al. | ..................... | 60/286 |
| 2004/0025498 A1 | 2/2004 | Lambert et al. | | |
| 2004/0093856 A1 | 5/2004 | Dingle et al. | | |
| 2009/0277207 A1 * | 11/2009 | Park | ............................ | 62/324.6 |

FOREIGN PATENT DOCUMENTS

| | | |
|---|---|---|
| DE | 197 43 302 C1 | 2/1999 |
| DE | 10 2004 030 441 A1 | 1/2006 |
| EP | 1 388 648 A1 | 2/2004 |
| WO | WO 03/033111 A2 | 4/2003 |
| WO | WO 2006/040086 * | 4/2006 |
| WO | WO 2006/040086 A1 | 4/2006 |
| WO | WO 2006/074833 A1 | 7/2006 |

* cited by examiner

*Primary Examiner* — Thomas Denion
*Assistant Examiner* — Jesse Bogue
(74) *Attorney, Agent, or Firm* — Ronald E. Greigg

(57) ABSTRACT

The invention relates to a device for supplying a reducing agent into an exhaust system of an internal combustion engine. The device includes a delivery pump for delivering the reducing agent from a storage tank into an exhaust tube of the exhaust system. A metering device is provided between the delivery pump and the exhaust tube, which metering device supplies reducing agent, which is delivered continuously by the delivery pump, in an intermittent fashion into the exhaust tube.

20 Claims, 1 Drawing Sheet

DEVICE FOR DELIVERING A REDUCING AGENT TO AN EXHAUST SYSTEM OF AN INTERNAL COMBUSTION ENGINE

CROSS-REFERENCE TO RELATED APPLICATION

This application is a 35 USC 371 application of PCT/EP 2007/052108 filed on Mar. 7, 2007.

BACKGROUND OF THE INVENTION

1. Field of the Invention

The invention relates to a device for delivering a reducing agent, in particular a mixture of urea and water, to an exhaust system of an internal combustion engine.

In selective catalytic reduction or SCR, to reduce the proportion of nitrogen oxide in the exhaust gas from diesel engines, a mixture of urea and water, commonly also called AdBlue, is delivered to the exhaust system. The urea in the injected solution is converted in the exhaust system into ammonia ($NH_3$), which in a downstream SCR catalytic converter converts the nitrogen oxides ($NO_x$) contained in the exhaust gas, forming molecular nitrogen ($N_2$) and water ($H_2O$). Since in this way the nitrogen oxides ($NO_x$) can be removed almost completely from the exhaust gas, diesel engines can be operated with a relatively lean mixture, which in turn makes fuel-saving operation of the engines possible. The use of other reducing agents, however, is also conceivable.

2. Prior Art

In known devices of the type defined at the outset, with which a mixture of urea and water is delivered as a reducing agent to the exhaust system, the deliver is effected either by means of a feed pump without a quantity-metering function, or by means of a metering pump. The feed pumps mentioned first have the advantage over metering pumps that they are not only chemically resistant to the urea or free ammonia in the mixture of urea and water, but if the mixture of urea and water freezes, they can also withstand the ice pressure resulting from its increase in volume without being damaged, which is not assured in the metering pumps mentioned second.

OBJECT AND SUMMARY OF THE INVENTION

With this as the point of departure, it is the object of the invention to improve a device of the type defined at the outset in such a way that it is not only resistant to reducing agent or its ingredients and proof against pressure in the case of reducing agents that contain water, but also allows quantity metering.

For attaining this object, it is proposed according to the invention that between the feed pump and the exhaust system, an additional metering device be provided, which delivers reducing agent, pumped continuously by the feed pump, to the exhaust system intermittently and thus takes on the quantity metering function. This embodiment makes it possible on the one hand to use time-tested conventional feed pumps without a quantity-metering function, which not only can be procured economically but also are resistant to reducing agent, such as a mixture of urea and water, and are proof against ice pressure. On the other, the feed pump can operate during the entire period of operation of the internal combustion engine, so that control of the pump can be dispensed with, which not only leads to cost savings but also, because of the sturdier construction of such feed pumps, also assures less vulnerability to malfunction. Moreover, the feed pump can optionally also be driven directly by the engine.

To provide for the most homogeneous possible distribution of the reducing agent in the exhaust gas, the reducing agent is injected into the exhaust system preferably by means of an injection nozzle. To avoid the necessity of an additional controller for the nozzle, this nozzle is expediently controlled by the pressure of the reducing agent upstream of the nozzle, and it opens when this pressure exceeds a defined opening pressure and closes when the pressure drops below the opening pressure. For controlling the pressure of the reducing agent upstream of the nozzle, the metering device is used, which in a preferred embodiment of the invention connects the compression side of the pump to a suction side of the pump when no reducing agent is to be delivered to the exhaust system, and which disconnects the compression side of the pump from the suction side when a pressure upstream of the nozzle is to be built up for the sake of delivering reducing agent to the exhaust system.

When the compression side of the pump is in communication with the suction side of the pump, this pump circulates the reducing agent. This means that a sufficient pressure that exceeds the opening pressure of the nozzle cannot build up upstream of the nozzle, and thus the nozzle remains closed. Conversely, when the compression side of the pump is disconnected from its suction side, a pressure that exceeds the opening pressure of the nozzle automatically builds up upstream of the nozzle as a result of the continuous pumping of the pump, so that the nozzle opens and assures a delivery of reducing agent into the exhaust system.

The metering device is preferably disposed along a pressure line, connecting the pump to the nozzle, as well as along an intake line, connecting the pump to the tank, and includes a return-flow conduit, which connects the pressure line and the intake line and can be opened or closed as needed by a controllable valve.

The valve is advantageously embodied as a magnet valve and has a valve member which is pressed by the force of a spring against a valve seat in the return-flow conduit, in order to close the return-flow conduit. By the deliver of current to the magnet valve, the valve member is lifted from the valve seat, in order to open the return-flow conduit.

Since at least some of the components of magnet valves, such as the coil and the current leads to the coil, are not resistant to typical reducing agents, such as a mixture of urea and water or ammonia outgassing from a mixture of urea and water, these components should not come into contact with the reducing agent, such as the mixture of urea and water, or its ingredients or products of decomposition, such as ammonia, so as to avoid corrosion and attendant problems in operation. For this reason, an opening penetrated by the valve member, between a coil chamber of the magnet valve and the return-flow conduit, around the valve member is hermetically sealed by an elastically deformable diaphragm.

To make the metering device resistant to ice pressure, so that it will not be damaged as a consequence of an expansion in volume of freezing reducing agent, such as a mixture of urea and water, in the metering device, the pressure line and/or the intake line inside the metering device are surrounded at least in part by elastically deformable compression bodies, which are compressed in the expansion in volume, caused by freezing, of the reducing agent and in this way assure a marked drop in the freezing pressure.

BRIEF DESCRIPTION OF THE DRAWINGS

The invention will be described in further detail below in conjunction with the drawings, in which.

DESCRIPTION OF THE PREFERRED EMBODIMENT

Figure 1:
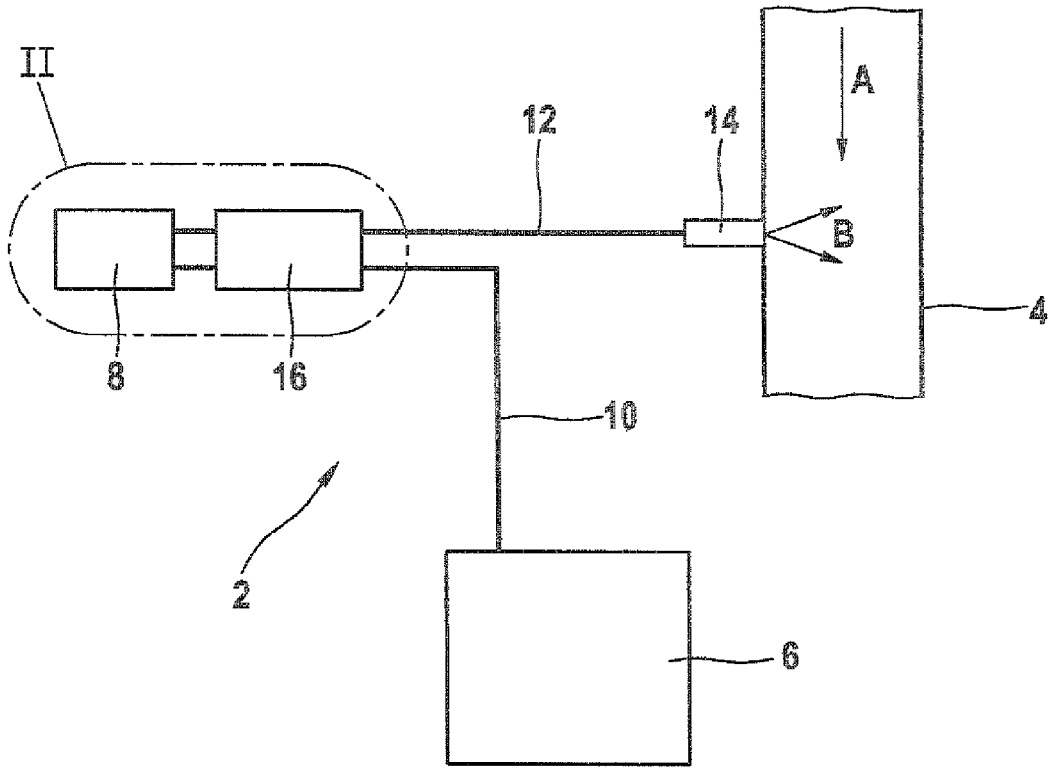
FIG. 1 is a schematic illustration of a device according to the invention for delivering a reducing agent, in the form of a mixture of urea and water, to an exhaust system of an internal combustion engine.

The device 2 shown in its entirety in FIG. 1 serves to deliver a reducing agent to an exhaust tube 4, through which exhaust gas from a diesel engine (not shown) flows in the direction of the arrow A. The delivered reducing agent is preferably a mixture of urea and water (AdBlue), but other reducing agents may also be used, in particular liquid reducing agents. The device 2 substantially comprises a tank 6 for the reducing agent, a conventional continuous-operation feed pump 8 for a liquid reducing agent, such as a mixture of urea and water, whose suction side communicates with the tank 6 through an intake line 10 and whose compression side communicates through a pressure line 12 with an injection nozzle 14 mounted on the exhaust tube 4, as well as a metering unit 16 for intermittently metering the reducing agent, pumped by the feed pump 8, through the injection nozzle 14 into the exhaust tube 4.

The injection nozzle 14, which for better mixing with the exhaust gas injects the reducing agent as a spray cone into the exhaust tube 4, as represented schematically by arrows B in FIG. 1, is a pressure-controlled nozzle, which opens when the pressure in the pressure line 12 upstream of the nozzle 14 exceeds a preset opening pressure of the nozzle 14. However, as long as the pressure in the pressure line 12 upstream of the nozzle 14 is below the opening pressure of the nozzle 14, the nozzle stays closed.

Figure 2:
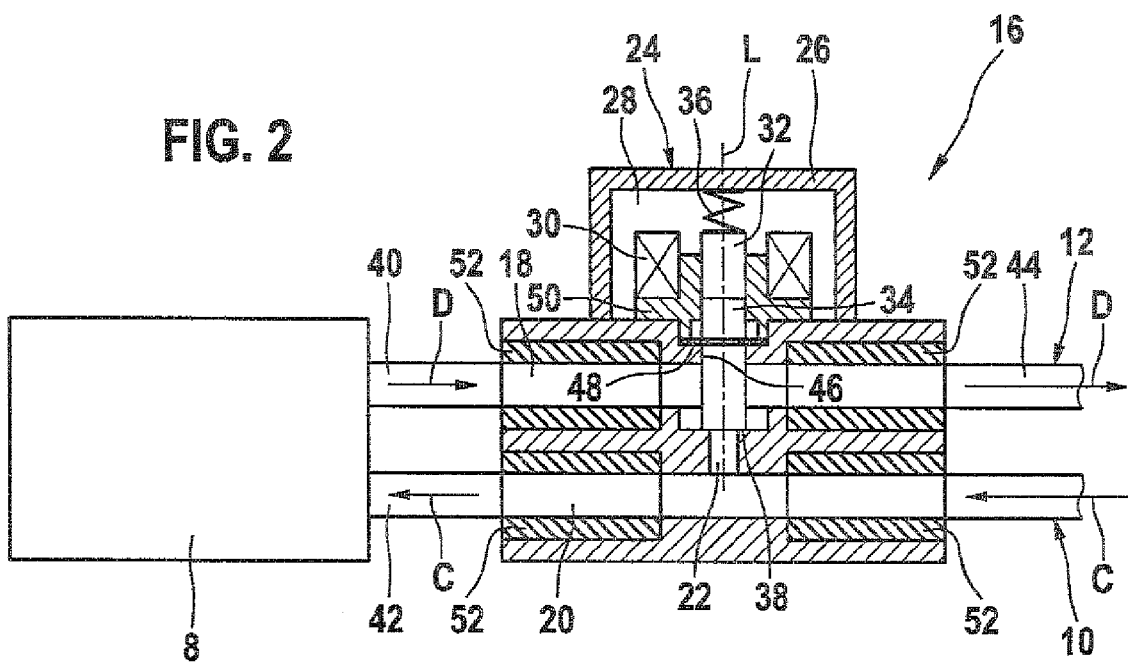
FIG. 2 is an enlarged view, partly in section, of the detail marked II in FIG. 1.

As best shown in FIG. 2, both the pressure line 12, leading from the feed pump 8 to the injection nozzle 14, and the intake line 10 leading from the tank 6 to the feed pump 8 extend through the metering unit 16, and line segments 18, 20 of the pressure line 12 and intake line 10 that are located inside the metering unit 16 are expediently oriented parallel to one another. These line segments 18, 20 communicate inside the metering unit 16 through a return-flow conduit 22, which with the aid of a magnet valve 24 of the metering unit 16 can be selectively opened or closed.

The magnet valve 24 includes a housing 26; a coil 30, accommodated in a coil chamber 28 of the housing 26, that can be subjected to current through current leads (not shown); a magnet armature 32, surrounded by the coil 30 and movable along a longitudinal axis L of the coil 30; a valve member 34, in the form of a valve needle, that is rigidly connected to the magnet armature 32; and a helical compression spring 36, which is disposed between the housing 26 and the face end, remote from the valve member 34, of the magnet armature 32.

In FIG. 2, to simplify the drawing, the pressure line 12 is shown above the intake line 10, and the magnet valve 24 is shown above the pressure line, while in practice, the pressure line 12, intake line 10, and return-flow conduit 22 are preferably all located side by side in the same plane, and the magnet valve 24 is disposed outside this plane, above or below the return-flow conduit 22.

In the currentless state of the coil 30, the compression spring 36 presses the valve member 34 against a valve seat 38 in the return-flow conduit 22, in order to close the latter, while a delivery of current to the coil 30 causes the magnet armature 32, counter to the force of the compression spring 36, to be displaced in the direction of the longitudinal axis L of the coil 30, and as a result, the valve member 34 is lifted from the valve seat 38, opening the return-flow conduit 22.

With the return-flow conduit 22 open, the feed pump 8 circulates reducing agent, aspirated from the tank, through a line segment 40 of the pressure line 12, which connects the compression side of the feed pump 8 with the return-flow conduit 22 in the metering unit 16, through the return-flow conduit 22 and through a line segment 42 of the intake line 10, which connects the return-flow conduit 22 to the suction side of the feed pump. As a result, in the line segment 44 of the pressure line 12 adjoining the metering unit 16 and leading to the injection nozzle 14, no pressure can build up. Thus the injection nozzle 14 remains closed, and no reducing agent is delivered to the exhaust tube 4. As soon as a delivery of reducing agent to the exhaust tube 4 is requested by a control unit (not shown) of the engine, the delivery of current to the coil 30 of the magnet valve 24 is discontinued, whereupon the compression spring 36 presses the valve member 34 against the valve seat 38 in the return-flow conduit 22 and closes this conduit, as shown in FIG. 2. When the feed pump 8, with the return-flow conduit 22 closed, pumps reducing agent from the tank 6 into the pressure line 12, as indicated by the arrows C and D in FIG. 2, a pressure builds up in the pressure line 12 that, if it exceeds the opening pressure of the injection nozzle 14, leads to a delivery of reducing agent to the exhaust tube 4.

The quantity of reducing agent delivered to the exhaust tube 4 depends on the capacity of the feed pump 8, the characteristic curve of the injection nozzle 14, and the duration of closure of the return-flow conduit 22 and can therefore be controlled by varying this last parameter.

If an additional pressure regulator (not shown) is provided between the feed pump 8 and the injection nozzle 14, then the quantity of reducing agent delivered to the exhaust system 4 depends on the pressure set at the pressure regulator and on the duration of closure of the return-flow conduit 22, so that once again, for controlling the quantity of reducing agent delivered to the exhaust tube 4, the duration of closure of the return-flow conduit 22 can be varied.

Since the magnet valve 24, or components of the magnet valve 24, such as the coil 30, the current supply lines to the coil 30 inside the housing 26, and optionally also the magnet armature 32 are as a rule not chemically resistant to reducing agents, or their ingredients or products of decomposition, a stepped bore 46, between the magnet valve 24 and the valve seat 38 of the return-flow conduit 22, that is penetrated by the valve member 34 is closed in fluidtight and gastight fashion by an elastically deformable diaphragm 48, so that reducing agent or its ingredients or products of decomposition from the return-flow conduit 22 is prevented from penetrating the coil chamber 28 of the magnet valve 24.

To that end, the annular diaphragm 48 is embedded with its inner circumferential edge in fluidtight and gastight fashion in an encompassing groove in the circumference of the valve member 34, while its outer circumferential edge is firmly clamped in fluidtight and gastight fashion between an annular shoulder of the stepped bore 46 and a coil holder protrudes partway into the stepped bore 46. The diaphragm 48 that is undeformed when the return-flow conduit 22 is closed becomes elastically deformed when the magnet armature 32, by delivery of current to the coil 30, is shifted in the direction of the longitudinal axis L of the coil 30, counter to the force of the spring 36, and in the process, the valve member 34 is lifted from the valve seat 38. However, in the process the annular gap between the valve member 34 and the wall of the stepped bore 46 is hermetically sealed by the diaphragm 48 in every valve position of the valve member 34.

While the feed pump 8, the pressure line 12, the intake line 10, the tank 6, and a filter (not shown) that may optionally be disposed between the tank 6 and the feed pump 8 are embodied in a known manner such that they are resistant to the resultant ice pressure if the liquid reducing agent contained in them freezes, the resistance of the metering unit 16 shown in FIG. 2 to ice pressure is attained by providing that the line segments 18 and 20, of the pressure line 12 and intake line 10, respectively, that extend through the metering unit are surrounded over a portion of their length by tubular compression bodies 52. The compression bodies 52 are elastically deformable, so that if the volume of the liquid reducing agent contained in the metering unit 16 increases as a consequence of freezing of the reducing agent, the compression bodies are compressed somewhat, and upon thawing of the reducing agent, they resume their original shape.

Since with a metering unit 16 of this kind all the components of the device 2 can be embodied as resistant to ice pressure, the complicated evacuation of the lines 10, 12 can be dispensed with. Incorrect metering, which can ensue from incomplete evacuation of the lines 10, 12, since the residual quantities of liquid reducing agent in the lines 10, 12 can lead to unwanted incorrect quantities during venting of the lines 10, 12 and thus can lead to deviations in the balance of the reducing agent delivered to the exhaust tube 4 and consequently deviations in the desired metering strategy as well, is also thus prevented.

The principle described for the metering unit 16 is applied to the injection nozzle 14 as well in order to make it proof against ice pressure, in that inside the injection nozzle 14, at least a portion of the pressure line 12 is surrounded by a tubular compression body (not shown).

The foregoing relates to the preferred exemplary embodiment of the invention, it being understood that other variants and embodiments thereof are possible within the spirit and scope of the invention, the latter being defined by the appended claims.

The invention claimed is:

1. A device for delivering a reducing agent to an exhaust system of an internal combustion engine, comprising:
   a feed pump for pumping the reducing agent from a tank into the exhaust system, the feed pump having a compression side and a suction side;
   a metering device disposed between the feed pump and the exhaust system, the metering device intermittently delivering the reducing agent which is pumped continuously by the feed pump into the exhaust system, and the metering device selectively connecting the compression side of the feed pump to, or disconnecting it from, the suction side of the feed pump;
   a control unit for triggering the metering device; and
   an injection nozzle for injecting the reducing agent into the exhaust system, the injection nozzle being disposed between the metering device and the exhaust system and being controlled by a pressure of the reducing agent delivered to the injection nozzle,
   wherein the control unit is arranged for triggering the metering device such that in the event that a delivery of reducing agent into the exhaust system is required, the compression side of the feed pump is disconnected from the suction side of the feed pump, so that the pressure of the reducing agent delivered to the injection nozzle opens the injection nozzle,
   wherein a pressure line leading from the compression side of the feed pump to the injection nozzle and an intake line leading from the tank to the suction side of the feed pump extend through the metering device, and
   wherein the metering device selectively connects the pressure line and the intake line to one another or disconnects them from one another.

2. The device as defined by claim 1, wherein the metering device includes a return-flow conduit which connects the pressure line and the intake line, and a controllable valve which closes and opens the return-flow conduit.

3. The device as defined by claim 2, wherein the controllable valve is a magnet valve and has a valve member, subjected to the force of a spring, that closes the return-flow conduit in a currentless state of the magnet valve.

4. The device as defined by claim 3, further comprising an elastically deformable diaphragm disposed between the magnet valve and the return-flow conduit, the diaphragm hermetically sealing a valve member bore in which the valve member is disposed, and the diaphragm being penetrated by the valve member.

5. The device as defined by claim 4, wherein the diaphragm is annular and along its inner circumference communicates in fluid-tight fashion with the valve member and along its outer circumference communicates in fluid-tight fashion with a boundary wall of the valve member bore.

6. The device as defined by claim 1, wherein the pressure line and the intake line are defined inside the metering device at least in part by tubular compression bodies which are elastically deformable, and wherein the compression bodies are compressed as a consequence of freezing of the reducing agent and resume their original shape upon thawing of the reducing agent.

7. The device as defined by claim 2, wherein the pressure line and the intake line are defined inside the metering device at least in part by tubular compression bodies which are elastically deformable, and wherein the compression bodies are compressed as a consequence of freezing of the reducing agent and resume their original shape upon thawing of the reducing agent.

8. The device as defined by claim 1, wherein the metering device is a component that is separate from the feed pump.

9. The device as defined by claim 2, wherein the metering device is a component that is separate from the feed pump.

10. The device as defined by claim 4, wherein the metering device is a component that is separate from the feed pump.

11. The device as defined by claim 6, wherein the metering device is a component that is separate from the feed pump.

12. The device as defined by claim 1, wherein the injection nozzle includes at least one elastically deformable compression body, which at least in some portions surrounds a line, inside the injection nozzle, for delivering the reducing agent to the exhaust system.

13. The device as defined by claim 2, wherein the injection nozzle includes at least one elastically deformable compression body, which at least in some portions surrounds a line, inside the injection nozzle, for delivering the reducing agent to the exhaust system.

14. The device as defined by claim 3, wherein the injection nozzle includes at least one elastically deformable compression body, which at least in some portions surrounds a line, inside the injection nozzle, for delivering the reducing agent to the exhaust system.

15. The device as defined by claim 4, wherein the injection nozzle includes at least one elastically deformable compression body, which at least in some portions surrounds a line, inside the injection nozzle, for delivering the reducing agent to the exhaust system.

16. The device as defined by claim 5, wherein the injection nozzle includes at least one elastically deformable compression body, which at least in some portions surrounds a line, inside the injection nozzle, for delivering the reducing agent to the exhaust system.

17. The device as defined by claim 1, wherein a segment of the pressure line and a segment of the intake line located inside the metering device communicate inside the metering device through a return-flow conduit.

18. The device as defined by claim 3, wherein the magnet valve further has a magnet armature between a housing of the magnet valve and the valve member and wherein the spring is disposed between the housing and a face end of the magnet armature remote from the valve member.

19. The device as defined by claim 5, wherein the valve member bore is a stepped bore and the annular diaphragm has an inner circumferential edge that is embedded in fluid-tight fashion in an encompassing groove in the circumference of the valve member and an outer circumferential edge that is clamped in fluid-tight fashion between an annular shoulder of the stepped bore and a coil holder that protrudes partway into the stepped bore.

20. The device as defined by claim 4, wherein the diaphragm is undeformed when the return-flow conduit is closed but becomes elastically deformed when a magnet armature of the magnet valve is shifted counter to the force of the spring.

* * * * *